United States Patent [19]

Wirth, Jr.

[11] Patent Number: 4,593,735
[45] Date of Patent: Jun. 10, 1986

[54] BORING, MORTISING, TENONING AND DUPLICATING WOODWORKING TOOL

[76] Inventor: John C. J. Wirth, Jr., 5604 Alameda NE., Albuquerque, N. Mex. 87111

[21] Appl. No.: 477,881

[22] Filed: Mar. 23, 1983

[51] Int. Cl.$^4$ ............................................. B27M 3/00
[52] U.S. Cl. .................... 144/144 R; 144/84; 144/137; 144/372; 409/89; 409/124; 409/108
[58] Field of Search ............... 74/471 R, 525; 409/87, 409/89, 124, 84, 108; 144/137, 144 R, 145 R, 84, 82, 372

[56] References Cited

U.S. PATENT DOCUMENTS

| | | | |
|---|---|---|---|
| 447,796 | 3/1891 | Smith | 409/108 |
| 1,058,384 | 4/1913 | Peters | 409/108 |
| 2,166,831 | 7/1939 | Wazac, Sr. | 144/84 |
| 2,912,879 | 11/1959 | Bannow | 74/525 |
| 3,442,309 | 5/1969 | Jentsch | 144/144 R |
| 4,163,465 | 8/1979 | Strong | 144/87 |

FOREIGN PATENT DOCUMENTS 256438 12/1925 Canada .
29570 9/1981 Canada .

*Primary Examiner*—W. D. Bray
*Attorney, Agent, or Firm*—Donald P. Smith

[57] ABSTRACT

Apparatus for woodworking including boring, mortising, tenoning, forming dovetails, duplicating a three dimensional object, and the like. The invention embodies means for providing movement of a workpiece in a horizontal plane or X-Y direction, and means for providing vertical cutting tool movement.

12 Claims, 3 Drawing Figures

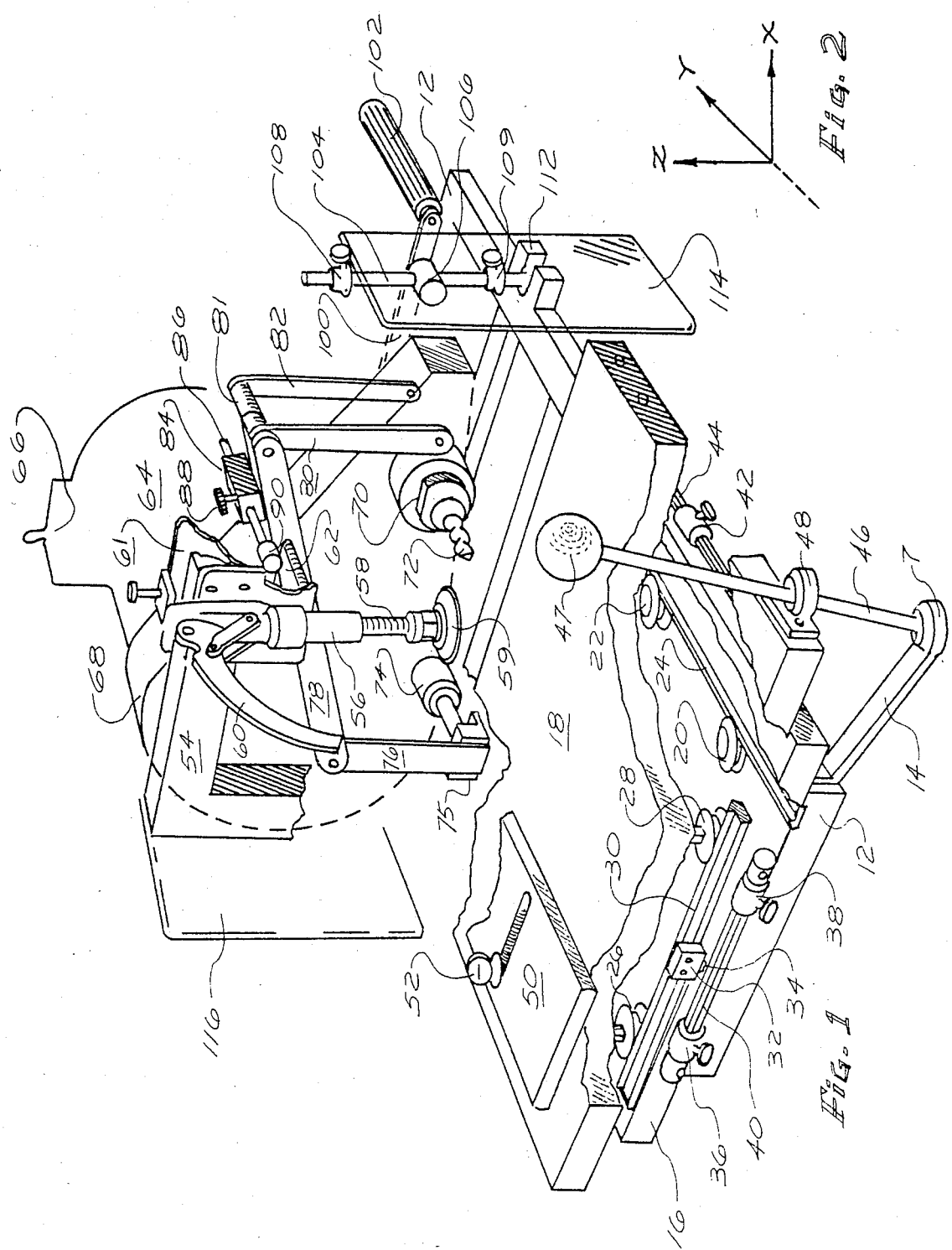

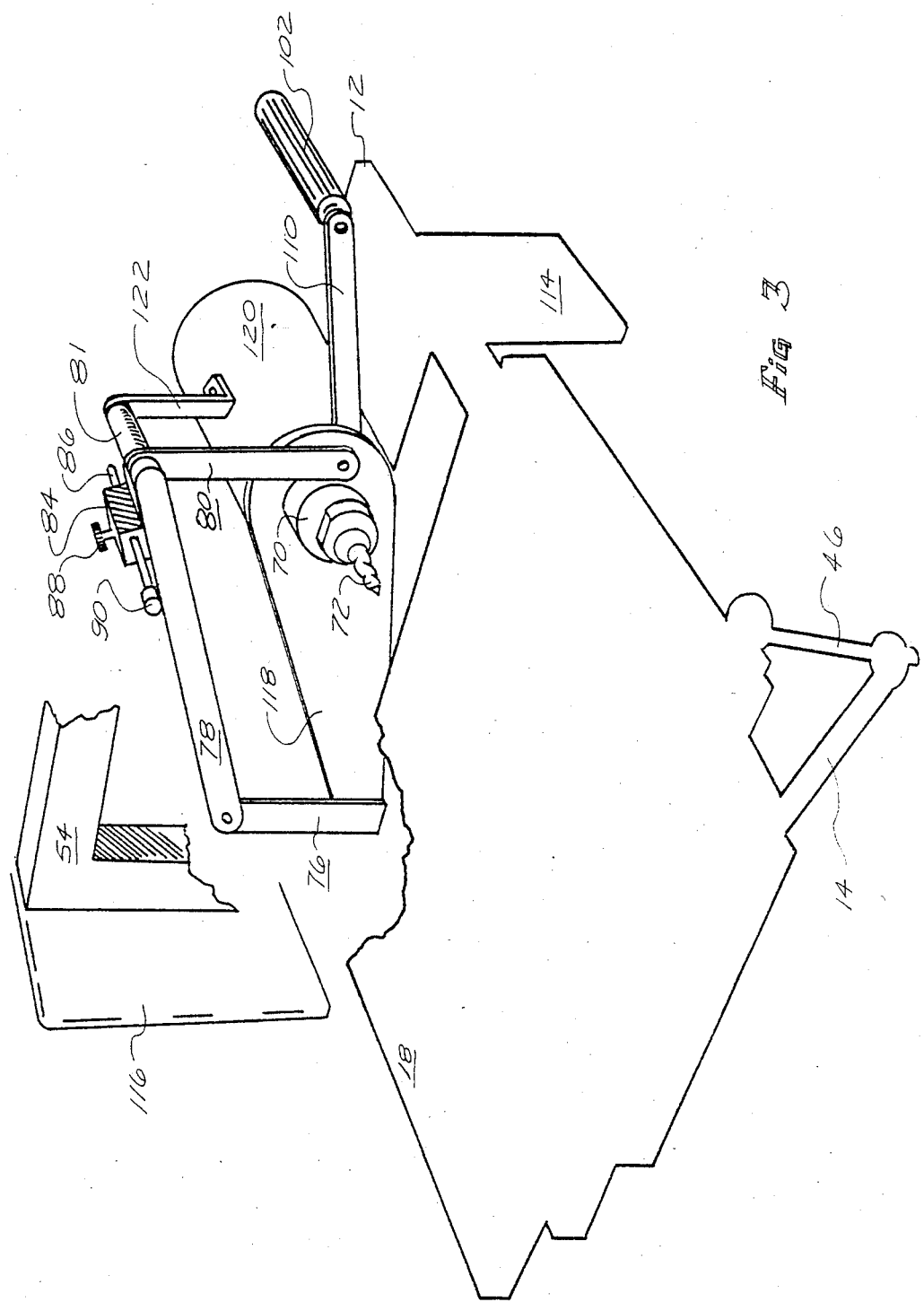

BORING, MORTISING, TENONING AND DUPLICATING WOODWORKING TOOL

BACKGROUND OF THE INVENTION (1) Field of the Invention

The present invention relates to apparatus and structure capable of fine woodworking and three-dimensional reproduction of an object.

(2) Description of the Prior Art

Industrial power driven woodworking machine tools and home craftsman power tools have been available for a long time and, as a result, a wide variety of machines capable of woodworking have been conceived and marketed. As the art developed, however, the machines have tended to become more and more complex in an apparent attempt to achieve speed and accuracy. As a result, such structures are increasingly expensive in first cost and require substantial and frequent maintenance by skilled craftsman. Thus, there remained a need for a versatile woodworking machine which is easily constructed and operated and is inexpensive and durable in continuous use. The structure to be hereinafter described as a preferred emobodiment exactly fills these requirements. U.S. Pat. No. 3,211,061 to Cretsinger shows a carving attachment for a radial arm saw to make carvings from a pattern. The attachment is secured to the motor mounting bracket of the radial arm saw and horizontal motion of the several arms shown is obtained by a rigid coupling bar, while vertical motion is achieved by arcuate motion of the arms about a shaft as an axis.

U.S. Pat. No. 3,739,824 to Hoening reveals a router and stylus arrangement having two relatively movable plates for horizontal movement, and a third and counterbalanced tilting plate to allow vertical movement.

U.S. Pat. No. 4,183,284 to Kaskowski shows a structure to produce a three dimensional reproduction of an object having a plurality of rotatable platforms and a counterweighted stylus-router assembly mounted to a shaft and rotatable therewith in a vertical plane.

None of the above-described patents appear to anticipate or even suggest the woodworking apparatus to be later described.

SUMMARY OF THE INVENTION

The invention relates to a woodworking power tool capable of boring, mortising, tenoning, forming dovetails and duplicating a three dimensional object which has compact size, manageable weight and relatively simple construction. It is accordingly an object of the invention to provide an accurate power tool that is capable of performing a plurality of cutting functions with minimum change-over time from one function to another.

It is yet another object of the invention to provide a power tool that maintains its accuracy in operation.

It is a further object of the invention to provide a power tool wherein the primary structure forms a parallelogram supporting a cutting means and a tracing means movable in a vertical plane, and a work supporting platform movable in a horizontal plane.

It is a yet further object of the invention to present a power tool wherein an operator by manual control can produce vertical movement of a cutting tool against a workpiece and simultaneous horizontal movement of the workpiece.

BRIEF DESCRIPTION OF THE DRAWING

FIG. 1 is a perspective view of the invention with portions cut away to reveal details of construction.

FIG. 2 is a diagram illustrating the several directions of motion of a workpiece and cutter.

FIG. 3 is a perspective view of another species of the invention.

DESCRIPTION OF THE PREFERRED EMBODIMENT

The following detailed description is of the best method, structure, and mode of carrying out the invention. The description is not to be taken in a limiting sense, but is made for the purpose of illustrating the general principles of the invention. The scope of the invention is defined by the appended claims. Reference is here made to the U.S. Patent Office Disclosure Document Ser. No. 109015 received in the Patent Office on June 16, 1982 and which reveals evidence of the conception and actual reduction to practice of the invention disclosed and claimed herein.

The embodiment of the invention to be hereinafter described reveals a power tool—one that is built to do boring, mortising, tenoning, dovetails, duplication of a three dimensional object, and other tasks with increased accuracy and speed over prior art methods of producing fine woodworking joinery. In addition the machine is portable.

Prior art hand and power tools such as hand drills, chisels, drill presses, routers, doweling jigs and mortise and tenon machines are usually inadequate in operation to perform joinery because of the low skill level of the user and the limited time available for the home craftsman. The machine of the present invention because of its ability to yield faster and more cost effective means of producing fine joinery, is a desirable addition to any inventory of power tools.

Referring now to FIGS. 1 and 2 there is shown a power tool constructed in accordance with the invention. The power tool includes a metal base 12 which can be positioned on any work bench of suitable height and stability. Arm 14 has its proximal end secured to base 12 and its distal end extending therefrom.

Reference character 16 designates a frame slidably supported on base 12 by rotatable wheel bearings 20 and 22 which ride on track 24. A travel limit detent 42 is movable on rail 44 and engages a depending lip (not shown) secured to the underside of platform 18. It will be understood that identical bearings and track and detent structure is on the other side of frame 16 to provide stable, level, horizontal motion in the Y direction.

Platform 18 is slidably mounted on frame 16 by rotatable wheel bearings 26 and 28 which ride on track 30. A travel limit detent 32 attached to the underside of platform 18 rides along rail 40 which has adjustable stops 36 and 38 for engagement by lip 34 of detent 32. Identical bearings, track and detent structure is provided on the other side of platform 18 to allow stable level horizontal motion in the X direction at a right angle to motion of frame 16.

An eye 48 is secured to platform 18 substantially as shown and a rod 46 having a handle 47 penetrates eye 48 and eye 7 formed in the distal end of arm 14. Spherical bearings are positioned in eye 48 and in eye 7 to receive rod 46 and allow motion of the handle and rod in any horizontal or X-Y direction. The rod 46 has a gradual diminition of thickness to form a tapered area where it is embraced by the bearings to permit sliding longitudinal bearing-rod engagement during operation.

A guide 50 is secured to platform 18 by thumb screw 52 to guide and position a workpiece during power tool operation. U-shaped bracket 54 is secured to platform 18 by any suitable means and carries a clamp assembly 56 with a handle 60 and a threaded shaft 58 with workpiece holding shoe 59 fitted thereto. On the other side of bracket 54 and shown generally as reference character 61 is a clamp for holding a three dimensional object 62 to be reproduced in a workpiece. In the drawing a tenon is shown.

A drive motor 64 having an operating switch 66 and having speed and torque characteristics suitable for efficient and continuous wood cutting duty has its output shaft belt connected to a cutting tool holder 70. A sturdy metal housing 68 attached to motor 64 shields the drive belts and supports the tool holder. Dust shield 116 is connected to the housing. A cutting tool 72 is held by the tool holder. The preferred cutting tool is a router bit. Bearing 74 supports motor 64 and housing 68 for pivotal motion in a vertical plane. A first arm 76 is fixed at one end to the base 12 by bracket 75. A second arm 78 is pivotally attached at one end to first arm 76 and pivotally attached at the other end to third arm 80. The other end of arm 80 is pivotally attached to housing 68. A parallelogram is thus formed with housing 68 acting as the fourth arm. Arm 82 is fixed parallel to third arm 80 and is connected to shaft 81 to straddle the housing substantially as shown. A mounting bracket 84 is secured to second arm 78 and has an aperture formed therein which is pierced by shaft 86 carrying rotatable follower or tracing element 90 and has an adjusting screw clamp 88 to engage shaft 86 in a desired position. Shaft 86 and router bit 72 are in the same vertical Y-Z plane and remain in the same plane as the cutting tool 72 is moved relative to base 12. The diameter of follower 90 is the same as the diameter of the router.

Rod 100 is attached to housing 68 on the side opposite tool holder 70 and extends horizontally and terminates in handle 102. A fork structure 112 extending from base 12 carries guide rod 104 and rider 106, which is penetrated by rod 104 and slides along rod 104 within the travel limit of stops 108 and 109.

An important feature of the invention is the use of a router bit as the cutting tool. As is known in the art, a router has cutting edges on both its longitudinal direction and on its end so that it will cut curved surfaces as well as the bottom of a cavity. Router bits of approximately 1" or less are usable in this invention. As the diameter of the router diminishes the angular velocity of the tool must increase; thus as a practical matter as the router bit diameter goes below one inch, at least 15,000 R.P.M. is needed to yield work of quality acceptable to the trade. For the purposes of this invention a router bit is defined as follows:

Router Bit: A cylindrical cutting tool adapted to be held in a tool holder at one end and having longitudinal portions cut away to form a plurality of cutting edges linearly or helically disposed about the longitudinal surface of the cylinder, the said cutting edges terminating at the other end of the tool and having a radial cutting edge formed on each respective end, each respective cutting edge pair forming an acute angle. The angles are ground to permit clear cutting without overheating in excess of 15,000 R.P.M.

The operation of the power tool hereinbefore described is within the skill level of a home craftsman or a woodworking student at secondary school rank and yet will produce accurate joinery rapidly and efficiently. The operator faces platform 18 and fixes a workpiece to the platform using guide 50 and clamping assembly 56. A three dimensional object which may be a master dovetail, a master dowel, or the tenon 62 shown in the drawing to be reproduced in the workpiece is secured by clamping means 61. With motor 64 in operation, the user operates handles 47 and 102 and obtains motion of the workpiece fixed to platform 18 in any horizontal or X-Y direction through the interaction of rod 46 against arm 14 and eye 48 and their included spherical bearings. Vertical motion results from moving handle 102 which causes follower 90 to engage tenon 62. Thus, operation of the two handles results in simultaneous vertical and horizontal motion of the follower against the tenon and the cutting tool (router bit) against the work piece.

Referring now to FIG. 3, a simpler and less costly species of the invention is shown. In this embodiment parts which are identical to the species of FIG. 1 are designated by identical reference characters. Comparing the two figures, one against the other, it will be seen that the base 12 and workpiece carrying structure 18 are the same and are shown in phantom outline for purposes of illustration. The parallelogram formed by arms 76, 78 and 80 are the same, but in this species member 118 forms the fourth leg of the parallelogram and carries motor 120 which instead of the capacitor-start constant speed high torque motor of FIG. 1 can be a series wound commutator type which is inexpensive as an off the shelf item. Router bit 72 is carried by tool holder 70 mounted on member 118 and turns with the output shaft of motor 120. Some speed reduction during the cutting operation is to be expected with this type of motor drive. Arm 122 is connected between motor 120 and shaft 81 for bracing purposes, and follower 90 carried by shaft 86 which penetrates mounting 84 is carried by arm 78 as previously described in FIG. 1.

The function of this species to the user of the woodworking tool is identical in that he operates handle 47 for motion of the workpiece in the X-Y direction and handle 102 for motion of the motor, parallelogram and router in the Y-Z direction. The purpose and intent of the species of FIG. 3 is to furnish to the woodworking community a relatively inexpensive, yet accurate and durable power tool that is a welcome addition to any inventory.

While the invention has been shown and described in detail in the drawing and specification, it will be apparent to those skilled in the art that many changes may be made in the construction and arrangement of parts without departing from the scope of the invention as defined in the appended claims.

I claim:

1. A machine tool for use in reproducing a three-dimensional object comprising in combination:
   (a) a drive motor, a router bit and a belt drive housing assembly pivotally mounted on a base for motion in a vertical plane,
   (b) a work carrying platform supported for motion in a horizontal plane mounted on said base, and
   (c) means for effecting simultaneous motion of said assembly and said platform by an operator.

2. The invention according to claim 1 including a parallelogram comprising four members pivotally connected one to another in said assembly and a tracing element fixed to one member of the parallelogram to follow a three dimensional object.

3. The invention according to claim 2 wherein the said tracing element and the said router bit are in the same vertical plane.

4. The invention according to claim 3 wherein the respective diameters of the said tracing element and the said router bit are the same.

5. A power tool having a drive motor, a rotatable cutting tool holder, belt means to rotatably connect the motor to the tool holder and a housing to cover the belt means and support the tool holder comprising in combination:
- (a) a base
- (b) a frame slidably mounted on said base for motion in a first horizontal plane,
- (c) a platform slidably mounted on said frame for motion at a right angle to said frame in a second horizontal plane,
- (d) means to support said motor and housing at one end thereof for motion in a vertical plane,
- (e) a bracket secured to said platform and moveable therewith,
- (f) means to secure a three dimensional object to one side of said bracket,
- (g) means on the other side of said bracket to secure a work piece to the platform,
- (h) first arm connected at one end to said motor supporting means,
- (i) a second arm pivotally connected to the other end of said first arm,
- (j) a third arm pivotally connected between the said second arm and the said housing, said first, second, third arms and said housing forming a parallelogram,
- (k) a tracing element secured to said second arm, and,
- (l) a vertical rod interconnecting between said base and said platform.

6. The invention according to claim 5 wherein the connections between the said rod and the said base and platform includes spherical bearings and the rod has a handle at its upper end.

7. The invention according to claim 6 wherein the said tracing element and said tool holder are in the same vertical plane.

8. The invention according to claim 7 including a router bit secured in said tool holder and wherein the diameter of said router bit corresponds to the diameter of said tracing element.

9. The invention according to claim 8 including a handle connected to said housing and extending in a horizontal plane wherein an operator controls motion of the tracing element and cutting tool with one hand and motion of the platform with the other hand during power tool operation to reproduce the object.

10. A machine tool for use in reproducing a three-dimensional object comprising in combination:
- (a) a base,
- (b) a frame sidably mounted on said base for motion in a first horizontal plane,
- (c) a platform sidably mounted on said frame for motion at a right angle to said frame in a second horizontal plane,
- (d) a series wound motor having a router bit secured to its output shaft,
- (e) means to support said motor for motion in a vertical plane,
- (f) a bracket secured to said platform having means to secure a three-dimensional object to one side thereof and means on the other side to secure a workpiece to said platform,
- (g) a first arm connected at one end to said motor supporting means,
- (h) a second arm pivotally connected to the other end of said first arm,
- (i) a third arm pivotally connected between the said second arm and the said motor supporting means, said first, second, third arms and said motor supporting means forming a parallelogram, and,
- (j) a tracing element secured to said second arm in the same vertical plane as the said router bit.

11. The invention according to claim 10 wherein the diameter of said router bit corresponds to the diameter of said tracing element.

12. The invention according to claim 11 including a vertical rod interconnecting between said base and said platform, and a handle connected to said motor supporting means whereby an operator controls motion of the tracing element and cutting tool with one hand and motion of the platform with the other hand during machine tool operation.

* * * * *